(12) United States Patent
Chang

(10) Patent No.: US 6,476,107 B1
(45) Date of Patent: Nov. 5, 2002

(54) ENVIRONMENTALLY FRIENDLY ADDITIVES FOR PLASTICS AND PROCESS FOR PRODUCING THE SAME

(75) Inventor: Chin-Tong Chang, Yun Lin Hsien (TW)

(73) Assignee: Formosa Taffeta Co., Ltd., Yun Lin Hsien (TW)

( * ) Notice: Subject to any disclaimer, the term of this patent is extended or adjusted under 35 U.S.C. 154(b) by 0 days.

(21) Appl. No.: 09/546,570

(22) Filed: Apr. 10, 2000

(30) Foreign Application Priority Data

Jun. 25, 1999 (CN) .......................... 88110708 A

(51) Int. Cl.$^7$ ................................. C08L 5/00
(52) U.S. Cl. .................. 524/174; 524/433; 521/465
(58) Field of Search ................. 524/433, 434, 524/437, 174, 204, 277, 313, 318, 435

(56) References Cited

U.S. PATENT DOCUMENTS

| 4,866,117 A | * | 9/1989 | Egashira ..................... 524/406 |
| 5,013,782 A | * | 5/1991 | Tateno ........................ 524/417 |
| 5,658,972 A | * | 8/1997 | Grzybowski et al. ......... 524/59 |

FOREIGN PATENT DOCUMENTS

JP    11-140331    5/1999

* cited by examiner

Primary Examiner—Edward J. Cain
Assistant Examiner—Katarzyna Wyrozebski
(74) Attorney, Agent, or Firm—Kenyon & Kenyon

(57) ABSTRACT

An environmentally friendly additive for plastics that can be added to any polyolefin plastic article, such as disposable articles like plastic bags, so as to decrease the amount of hydrochloric acid gas evolved by a waste disposal incinerator that burns the spent article along with chlorinated waste.

25 Claims, 3 Drawing Sheets

ENVIRONMENTALLY FRIENDLY ADDITIVES FOR PLASTICS AND PROCESS FOR PRODUCING THE SAME

FIELD OF THE INVENTION

The present invention relates to environmentally friendly additives for plastics and a process for producing the same.

BACKGROUND OF THE INVENTION

The ability of organic or inorganic chlorine-containing substances to dissociate and release chlorine ions in incinerators, the amount of hydrogen provided by water existing in wastes, and the concentration of alkaline metals contained in the wastes are the main factors to influence the formation of hydrochloric acid and heavy metal chlorides during the incineration of wastes. The chlorine ions released from different chlorine-containing substances in incinerators easily react with a large amount of hydrogen provided by humid wastes and to form hydrochloric acid.

"Dioxin" is an organic chloride compound, which comprises 75 chloride compounds. Among monochloro dioxin and polychloro dioxin, the most hazardous and poisonous dioxin is 2,3,7,8-tetrachloro dioxin because of the different arrangement of the chlorine atoms.

The chemical formula of dioxin is as follows:

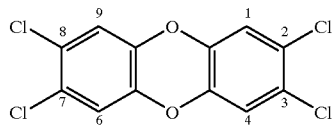

Accordingly, it is highly necessary to obtain an environmentally friendly additive to be incorporated into plastic products to reduce the amount of hydrochloric acid released when the plastic products are incinerated.

BRIEF DESCRIPTION OF THE DRAWINGS

FIG. 2 shows a few high-density polyethylene bags, in which

FIG. 4 shows a few plastic products, in which

DETAILED DESCRIPTION OF THE INVENTION

Figure 1:
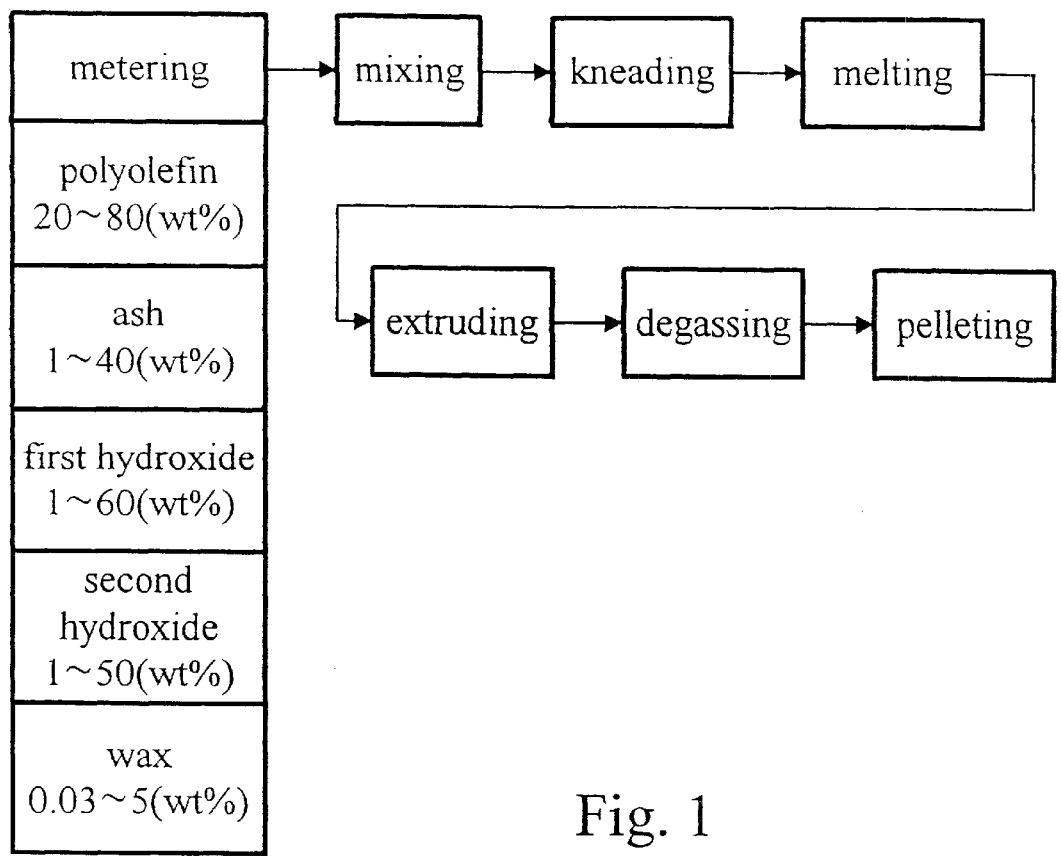
FIG. 1 is a flow chart for producing the environmentally friendly additive for plastics.
Figure 2A:
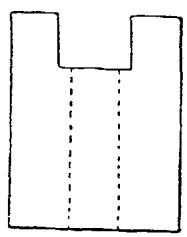
FIG. 2a shows a shopping bag.
Figure 2B:
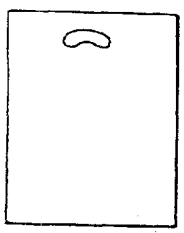
FIG. 2b shows a merchandise bag.
Figure 2C:
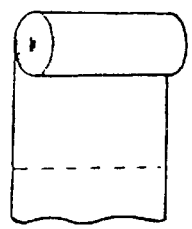
FIG. 2c shows a roll bag.
Figure 2D:
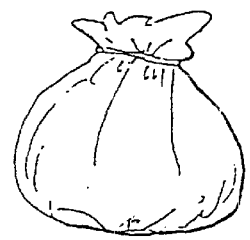
FIG. 2d shows a waste bag.
Figure 3:
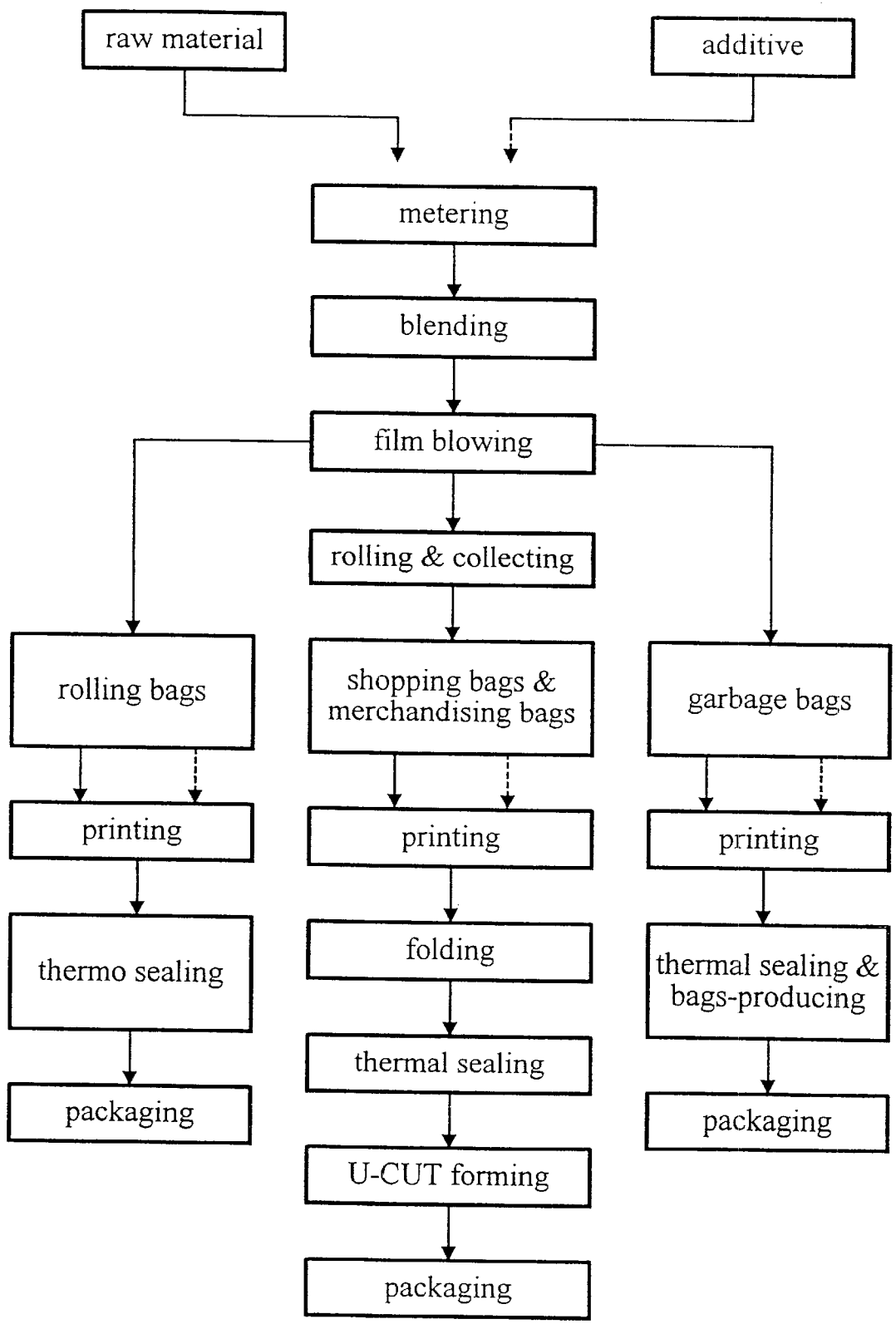
FIG. 3 is a flow chart for producing the high-density polyethylene shopping bags, in which raw materials and additives for plastics are subject to the steps, for example, metering, blending, film blowing and printing, to make products.
Figure 4A:
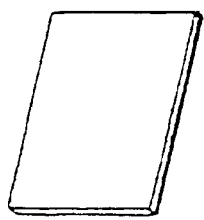
FIG. 4a shows a sheet product (by extrusion molding)
Figure 4B:
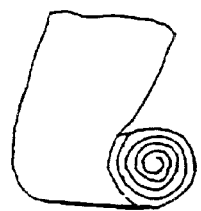
FIG. 4b shows a film product (by blow molding)
Figure 4C:
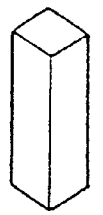
FIG. 4c shows plate products (by extrusion molding)
Figure 4D:
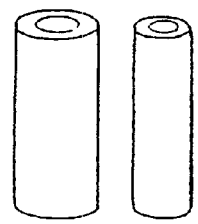
FIG. 4d shows tubular products (by extrusion molding)
Figure 4E:
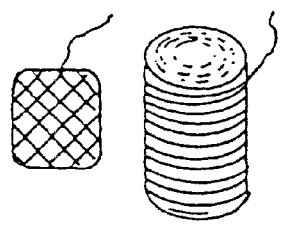
FIG. 4e shows a package product (by extrusion molding)
Figure 4F:
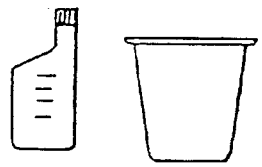
FIG. 4f shows bottle and tube products (by injection molding).

By way of illustration and to provide a more complete appreciation of the present invention with many of the attendant advantages thereof, the following detailed description is given concerning environmentally friendly additives for plastics and a process for producing the same.

The invention is directed to the use of ash and hydroxides. The plastic products in which ash and hydroxides are added can provide environmental protection effect. Ash and hydroxides can be incorporated into polyolefins, such as general purpose plastics, to render the plastics environmentally advantageous for reducing the amount of hydrochloric acid gas released and for preventing formation of dioxins. The additive is environmentally friendly since it preferably absorbs more than 0.2 g of hydrochloric acid gas per gram of additive, for instance, 0.2 to 1, preferably 0.3 to 0.9, more preferably 0.45 to 0.8 g per gram of additive.

The invention is related to an environmentally friendly additive for plastics, comprising 1 to 40% by weight of ash, 20 to 80% by weight of a 10 carrier, 1 to 60% by weight of a first hydroxide, and 1 to 50% by weight of a second hydroxide.

The invention is also related to a process for producing an environmentally friendly additive for plastics, comprising the steps of mixing, kneading, melting, extruding, degassing, and pelleting a combination of 1 to 40% by weight of ash, 20 to 80% by weight of a carrier, 1 to 60% by weight of a first hydroxide, and 1 to 50% by weight of a second hydroxide to produce the additive.

The ash is preferably ash which has been incinerated in thermo-power plants. The most preferable ash is bottom ash produced from thermo-power plants. The alkaline metals contained in the ash such as Mg, K, and Ca react with hydrochloric acid in incinerators to form chlorides.

The chlorides are incinerated to form precipitated residues which are easily treated and will not spread out and pollute the environment. The particle size of the ash is 0.1 to 240 $\mu$m, preferably 0.1 to 120 $\mu$m, and most preferably 0.1 to 4 $\mu$m. The ash is preferably in an amount of 5 to 20% by weight and more preferably in an amount of 5 to 10% by weight.

The carrier should be such that it can be blended homogeneously with and cover the ash and hydroxides. The carrier is preferably a low molecular weight polyolefin. The preferable molecular weight is in a range from 15,000 to 200,000, more preferably 15,000 to 150,000, and most preferably 15,000 to 50,000. Examples of the polyolefin include polyethylene (PE), polypropylene (PP), acrylonitrile-butadiene-styrene (ABS), polystyrene (PS), polyvinyl chloride (PVC) and ethylene vinyl acetate (EVA). The preferable carrier is polyethylene. The carrier is preferably in an amount of 20 to 50% by weight and more preferably in an amount of 35 to 50% by weight An example of the first hydroxide is calcium hydroxide. The first hydroxide is preferably in an amount of 10 to 60% by weight and more preferably in an amount of 10 to 50% by weight.

The second hydroxide is different from the first hydroxides An example of the second hydroxide is selected from at least one consisting of aluminum hydroxide, ferric hydroxide, and magnesium hydroxide. The most preferable second hydroxide is aluminum hydroxide. The second hydroxide is preferably id an amount of 1 to 40% by weight and more preferably in an amount of 1 to 30% by weight. Persons skilled in the art can choose an appropriate amount for each second hydroxide if more than one are used so that the total of all second hydroxides is 1 to 500% by weight of the additive.

The environmentally friendly additive for plastics can further comprise 0.03 to 5% by weight, preferably 0.03 to 2% by weight, of an internal lubricant. Examples of the internal lubricant are wax such as polyethylene wax, calcium stearate, zinc stearate, lead stearate, stearamide, and ethylene-bisstearamide.

The operation conditions for the mixing, kneading, melting, extruding, degassing, and pelleting are known to persons skilled in the art and can be appropriately chosen by skilled persons to practice the process.

An amount of 1 to 50% by weight of the additive can be incorporated into polyolefin plastic materials such as general purpose plastic materials with the proviso that the incorporation will not negatively influence the original properties of the plastic materials. The incorporation of the additive may affect the original properties of the plastic materials, but that any negative influence is sufficiently minor that it can be tolerated in practice. After the incorporation, the mixture of the additive and plastic materials are subjected to well known steps such as blending and film blowing to produce plastic products. The plastic products thus obtained can chemically bond with the chlorine ion released from organic or inorganic chlorines, which have been burned in incinerators, so as to prevent the formation of hydrochloric acid gas during incineration. Examples of the polyolefin plastic materials are high-density polyethylene (HDPE), low-density polyethylene (LDPE), polypropylene (PP), acrylonitrile-butadiene-styrene (ABS), polystyrene (PS), polyvinyl chloride (PC) and ethylene vinyl acetate (EVA).

The mechanism of the reduction of the formation of hydrochloric acid gas by hydroxides is as follows:

$$A(OH)_m + B(OH)_n + (m+n)HCl \rightarrow ACl_m + BCl_n + (m+n)H_2O$$

The environmentally friendly additive for plastics can be applied in the production of plastic bags. High-density polyethylene (HDPE) is widely used to mass-produce shopping bags and waste bags because it is without toxicity and is easily produced by blowing molding. The ordinary family even uses bags produced from high-density polyethylene as waste bags and hence a relatively large amount of wastes in incinerators are high-density polyethylene bags. The incorporation of the environmentally friendly additive for plastics of the invention into the plastic bags, such as high-density polyethylene plastic bags, provides the additive for bonding with the chlorine ions released from incinerators so as to reduce the formation of hydrochloric acid gas -and the emission of dioxin. Hence, because of the use of the additive of the subject invention, plastic bags are environmentally protective.

EXAMPLE 1

Preparation of Environmentally Friendly Additive for Plastics 45 g polyethylene (PE), 43 g calcium hydroxide, 5 g aluminum hydroxide, 5 g ash, and 2 g wax are mixed with a high speed in a blender for 5 minutes. When the temperature of the mixture reaches 95° C., the above mixture is applied to an extruder and the mixture is thoroughly dispersed to produce a melt. The extruder must be controlled at a temperature below 190° C. After leaving a gate of the extruder, the melt is cut into pellet-like additive for plastics with a rolling knife for further blending with plastics.

EXAMPLE 2

Effect of Additive for Plastics in Absorbing Hydrochloric Acid Gas 2 g additive for plastics produced from Example 1 is powdered and blended homogeneously with 2 g polyvinyl chloride (PVC) in an Erlenmeyer flask (Flask A) equipped with a nitrogen inlet. The flask is further connected to an Erlenmeyer flask (Flask B) containing 90 ml sodium hydroxide aqueous solution (0.5N) through a U-shaped glass tube. The Flask A is heated on a plate at a temperature from 300 to 310° C. for about ten minutes. When no further bubbles evolve from tie sodium hydroxide aqueous solution, nitrogen gas is applied to the Flask A. The rate of nitrogen gas is maintained so that the nitrogen gas can flow out from the sodium hydroxide aqueous solution. The Flask A is further heated from 40 to 50 minutes. Finally, the chlorine content of the 90 ml absorbent sodium hydroxide (0.5N) is analyzed and the amount of hydrochloric acid gas converted is calculated. The data obtained are listed in the Table below:

TABLE

| Amount of environmentally friendly additive for plastics (g) | Amount of PVC for producing hydrochloric acid gas (g) | Amount of hydrochloric acid gas which is absorbed by environmentally friendly additive for plastics (g) | Amount of hydrochloric acid gas which is absorbed by sodium hydroxide solution (g) | Total amount of hydrochloric acid gas produced (g) | Amount of hydrochloric acid gas absorbed by per gram of environmentally friendly additive for plastics (g) |
| --- | --- | --- | --- | --- | --- |
| 2(1) | 2 | 1.04 | 0.06 | 1.10 | 0.52 |
| 2(2) | 2 | 1.06 | <0.01 | 1.06 | 0.53 |

EXAMPLE 3

Effect of Absorbing Hydrochloric Acid Gas of PE Bags Comprising Environmentally Friendly Additive for Plastics 0.4 g high-density polyethylene (HDPE) film comprising the additive for plastics produced from Example 1 is applied to al test plate provided in a high temperature test tube which is set at 800° C. and has an air input of 0.5 ml per minute. The test tube is maintained at that temperature for 10 minutes. After thorough burning, a gas sample is collected for testing. The result of the testing indicates that each gram of the environmentally friendly additive for plastics absorbs 400 mg of hydrochloric acid gas.

Since the amount of "hydrochloric acid gas," the source for producing dioxin, can be great decreased, it is believed that the environmentally friendly additive for plastics of the invention can effectively, inhibit the formation of dioxins.

The present invention may, of course, be carried out in other specific ways than those herein set forth without departing from the spirit and essential characteristics of the present invention. The present embodiments are, therefore, to be considered in all respects as an illustration and not restrictive. Therefore, any changes coming within the meaning and equivalent range of the appended claims are to be embraced therein.

What is claimed is:

1. An environmentally friendly additive for plastics, comprising 1 to 50% by weight of ash, 20 to 80% by weight of a carrier, 1 to 60% by weight of a first hydroxide, and 1 to 50% by weight of a second hydroxide, wherein when the additive is blended with polyvinylchloride and the blend is incinerated, the additive absorbs hydrochloric acid gas given off by the polyvinylchloride.

2. An environmentally friendly additive for plastics according to claim 1, wherein said ash has been incinerated in thermo-power plants.

3. An environmentally friendly additive for plastics according to claim 1, wherein said first hydroxide is calcium hydroxide.

4. An environmentally friendly additive for plastics according to claim 1, wherein said second hydroxide is selected from at least one consisting of aluminum hydroxide, ferric hydroxide, and magnesium hydroxide.

5. An environmentally friendly additive for plastics according to claim 4, wherein said second hydroxide is aluminum hydroxide.

6. An environmentally friendly additive for plastics according to claim 1, wherein said carrier is a lower molecular weight polyolefin.

7. An environmentally friendly additive for plastics according to claim 6, wherein said polyolefin is selected from the group consisting of polyethylene (PE), polypropylene (PP), acrylonitrile-butadiene-styrene (ABS), polystyrene (PS), polyvinyl chloride (PVC) and ethylene vinyl acetate (EVA).

8. An environmentally friendly additive for plastics according to claim 7, wherein said polyolefin is polyethylene.

9. An environmentally friendly additive for plastics according to claim 1, further comprising 0.03 to 5% by weight of an internal lubricant.

10. An environmentally friendly additive for plastics according to claim 9, wherein said lubricant is selected from the group consisting of wax, calcium stearate, zinc stearate, lead stearate, stearamide, and ethylene-bisstearamide.

11. An environmentally friendly additive for plastics according to claim 10, wherein said wax is polyethylene wax.

12. An environmentally friendly additive for plastics according to claim 11, which is incorporated into polyolefin plastic materials in an amount of 1 to 50% by weight.

13. An environmentally friendly additive for plastics according to claim 12, wherein said polyolefin plastic materials are selected from the group consisting of high-density polyethylene (HDPE), low-density polyethylene (LDPE), polypropylene (PP), acrylonitrile-butadiene-styrene (ABS), polystyrene (PS), polyvinyl chloride (PVC) and ethylene vinyl acetate (EVA).

14. A process for producing an environmentally friendly additive for plastics, comprising the steps of mixing, kneading, melting, extruding, degassing, and pelletizing a combination of 1 to 40% by weight of ash, 20 to 80% by weight of a carrier, 1 to 60% by weight of a first hydroxide, and 1 to 50% by weight of a second hydroxide to produce the additive.

15. A process according to claim 14, wherein said ash has been incinerated in thermo-power plants.

16. A process according to claim 14, wherein said first hydroxide is calcium hydroxide.

17. A process according to claim 14, wherein said second hydroxide is selected from the group consisting of aluminum hydroxide, ferric hydroxide, and magnesium hydroxide.

18. A process according to claim 17, wherein said second hydroxide is aluminum hydroxide.

19. A process according to claim 14, wherein said carrier is a lower molecular weight polyolefin.

20. A process according to claim 19, wherein said polyolefin is selected from the group consisting of polyethylene (PE), polypropylene (PP), acrylonitrile-butadiene-styrene (ABS), polystyrene (PS), polyvinyl chloride (PVC) and ethylene vinyl acetate (EVA).

21. A process according to claim 20, wherein said polyolefin is polyethylene.

22. A process according to claim 14, wherein said additive for plastics further comprises 0.03 to 5% by weight of an internal lubricant.

23. A process according to claim 22, wherein said lubricant is selected from the group consisting of wax, calcium stearate, zinc stearate, lead stearate, stearamide, and ethylene-bisstearamide.

24. A process according to claim 23, wherein said wax is polyethylene wax.

25. The environmentally friendly additive of claim 1 that absorbs more than 0.2 grams of hydrochloric acid gas per gram of additive when burned.

* * * * *

UNITED STATES PATENT AND TRADEMARK OFFICE
CERTIFICATE OF CORRECTION

PATENT NO. : 6,476,107 B1 Page 1 of 1
DATED : November 5, 2002
INVENTOR(S) : Chin-Tong Chang It is certified that error appears in the above-identified patent and that said Letters Patent is hereby corrected as shown below:

Column 2,
Line 14, delete "10";
Line 53, change "ides An" to -- ide. An --;
Line 57, change "id" to -- in --;
Line 61, change "500%" to -- 50% --;

Column 3,
Line 55, change "-and" to -- and --;

Column 4,
Line 21, change "tie" to -- the --;
Line 49, change "al" to -- a --; and
Line 59, after "effectively," delete ",".

Signed and Sealed this

First Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,476,107 B1
DATED : November 5, 2002
INVENTOR(S) : Chin-Tong Chang It is certified that error appears in the above-identified patent and that said Letters Patent is hereby corrected as shown below:

<u>Column 5,</u>
Line 3, after "to" and before "by weight", delete "50%" and insert therefor -- 40% --.

Signed and Sealed this

Twenty-first Day of June, 2005

JON W. DUDAS
*Director of the United States Patent and Trademark Office*